US010257701B2

(12) United States Patent
O'Gorman et al.

(10) Patent No.: US 10,257,701 B2
(45) Date of Patent: Apr. 9, 2019

(54) METHODS, SYSTEMS, AND MEDIA FOR AUTHENTICATING A CONNECTION BETWEEN A USER DEVICE AND A STREAMING MEDIA CONTENT DEVICE

(71) Applicant: Google LLC, Mountain View, CA (US)

(72) Inventors: Liam O'Gorman, Los Altos, CA (US); Nate Plumley, San Francisco, CA (US); Jagjit Singh Chawla, Milpitas, CA (US); Brian Patrick Williams, Mountain View, CA (US)

(73) Assignee: Google LLC, Mountain View, CA (US)

( * ) Notice: Subject to any disclaimer, the term of this patent is extended or adjusted under 35 U.S.C. 154(b) by 106 days.

(21) Appl. No.: 15/320,450

(22) PCT Filed: Jun. 24, 2015

(86) PCT No.: PCT/US2015/037492
§ 371 (c)(1),
(2) Date: Dec. 20, 2016

(87) PCT Pub. No.: WO2015/200521
PCT Pub. Date: Dec. 30, 2015

(65) Prior Publication Data
US 2017/0201882 A1    Jul. 13, 2017

Related U.S. Application Data

(60) Provisional application No. 62/016,470, filed on Jun. 24, 2014.

(51) Int. Cl.
*H04W 12/06* (2009.01)
*H04L 29/06* (2006.01)
*H04L 29/08* (2006.01)

(52) U.S. Cl.
CPC .......... *H04W 12/06* (2013.01); *H04L 63/083* (2013.01); *H04L 63/0876* (2013.01);
(Continued)

(58) Field of Classification Search
CPC .. H04W 12/06; H04L 63/083; H04L 63/0876; H04L 65/4076; H04L 67/04; H04L 67/125; H04L 67/18; H04L 63/0492
See application file for complete search history.

(56) References Cited

U.S. PATENT DOCUMENTS 7,792,756 B2 *  9/2010  Plastina ................. G06Q 30/02
                                                    705/51
8,768,306 B1 *  7/2014  Ben Ayed ............. H04W 12/06
                                                    455/411

(Continued)

FOREIGN PATENT DOCUMENTS

KR    20090126354 A  * 12/2009
KR    20100031748 A  *  3/2010  ........... G11B 27/034

OTHER PUBLICATIONS

International Search Report and Written Opinion of the International Searching Authority dated Oct. 6, 2015 in International Patent Application No. PCT/US2015/037492.
(Continued)

*Primary Examiner* — Darren B. Schwartz
(74) *Attorney, Agent, or Firm* — Byrne Poh LLP

(57) ABSTRACT

Mechanisms for authenticating a connection between a user device and a streaming media content device comprising: identifying a collection of candidate streaming media content devices based on beacon(s) detected by a user device; receiving an indication that one of the content devices is to be selected for connection to the user device; transmitting instructions to the content devices to broadcast a signal, wherein the signal broadcast by each of the content devices contains a value that indicates an identity of the content
(Continued)

device; receiving, from the user device, an audio signal that includes a detected signal; processing the audio signal to extract the value indicating the identity of a particular content device associated with the detected signal contained in the received audio signal; identifying the particular content device based on the determined value; and transmitting an indication that the user device and the particular content device are authenticated to communicate.

19 Claims, 6 Drawing Sheets

(52) U.S. Cl.
CPC ............ *H04L 67/04* (2013.01); *H04L 67/125* (2013.01); *H04L 67/18* (2013.01); *H04L 63/0492* (2013.01); *H04L 65/4076* (2013.01)

(56) References Cited

U.S. PATENT DOCUMENTS

| | | | |
|---|---|---|---|
| 8,850,532 B2* | 9/2014 | Belz | G06F 21/10 726/5 |
| 9,332,385 B1* | 5/2016 | Abraham | H04W 4/02 |
| 9,350,720 B2* | 5/2016 | Lund | H04L 63/08 |
| 9,449,181 B1* | 9/2016 | Umapathy | G06F 21/62 |
| 9,723,003 B1* | 8/2017 | McClintock | H04L 63/10 |
| 2004/0010701 A1* | 1/2004 | Umebayashi | G06F 21/6227 713/193 |
| 2006/0186199 A1* | 8/2006 | Parker | G06F 21/35 235/382 |
| 2010/0164693 A1* | 7/2010 | Zhang | H04L 12/2809 340/10.31 |
| 2011/0119491 A1* | 5/2011 | Nocera | H04L 9/3226 713/170 |
| 2011/0210816 A1* | 9/2011 | Wang | H04L 63/0428 340/3.71 |
| 2011/0277023 A1* | 11/2011 | Meylemans | G06F 21/335 726/7 |
| 2012/0044057 A1* | 2/2012 | Kang | H04L 63/10 340/10.4 |
| 2012/0117586 A1* | 5/2012 | McCoy | H04N 21/4126 725/25 |
| 2013/0024919 A1* | 1/2013 | Wetter | G06F 21/335 726/6 |
| 2013/0111039 A1* | 5/2013 | Gomes | H04W 4/023 709/227 |
| 2013/0122810 A1* | 5/2013 | Kaufman | H04W 4/21 455/41.2 |
| 2013/0143529 A1* | 6/2013 | Leppanen | H04W 4/08 455/411 |
| 2013/0152168 A1* | 6/2013 | Nasir | H04W 12/08 726/4 |
| 2013/0223279 A1* | 8/2013 | Tinnakornsrisuphap | H04L 41/0809 370/254 |
| 2014/0007198 A1* | 1/2014 | Durbha | H04L 63/102 726/4 |
| 2014/0096219 A1* | 4/2014 | Lang | H04N 21/25875 726/9 |
| 2014/0195582 A1* | 7/2014 | Sherwood | H04L 67/10 709/201 |
| 2014/0235168 A1* | 8/2014 | Molettiere | H04B 7/26 455/41.2 |
| 2014/0325610 A1* | 10/2014 | Hitomi | G06F 9/468 726/4 |
| 2014/0344848 A1* | 11/2014 | Busse | H04N 21/4122 725/28 |
| 2014/0359140 A1* | 12/2014 | Shankarraman | H04L 65/1069 709/227 |
| 2015/0024712 A1* | 1/2015 | Kang | H04W 4/16 455/411 |
| 2015/0082184 A1* | 3/2015 | Kim | H04L 67/10 715/740 |
| 2015/0106887 A1* | 4/2015 | Aslund | H04L 63/0492 726/5 |
| 2015/0113579 A1* | 4/2015 | Baek | H04N 21/41407 725/110 |
| 2015/0121466 A1* | 4/2015 | Brands | H04L 63/08 726/4 |
| 2015/0195669 A1* | 7/2015 | Grover | H04W 4/003 455/414.1 |
| 2015/0281181 A1* | 10/2015 | Albisu | H04L 63/0272 726/7 |
| 2015/0281302 A1* | 10/2015 | Winston | H04W 12/06 709/219 |
| 2015/0327060 A1* | 11/2015 | Gilson | H04W 76/10 726/7 |
| 2015/0339274 A1* | 11/2015 | Pappu | H04N 21/4126 715/205 |
| 2016/0353150 A1* | 12/2016 | Hashimoto | H04N 21/23617 |
| 2016/0360259 A1* | 12/2016 | Hashimoto | H04H 20/93 |

OTHER PUBLICATIONS

Office Action dated Dec. 4, 2018 in KR Patent Application No. 10-2016-7036760.

\* cited by examiner

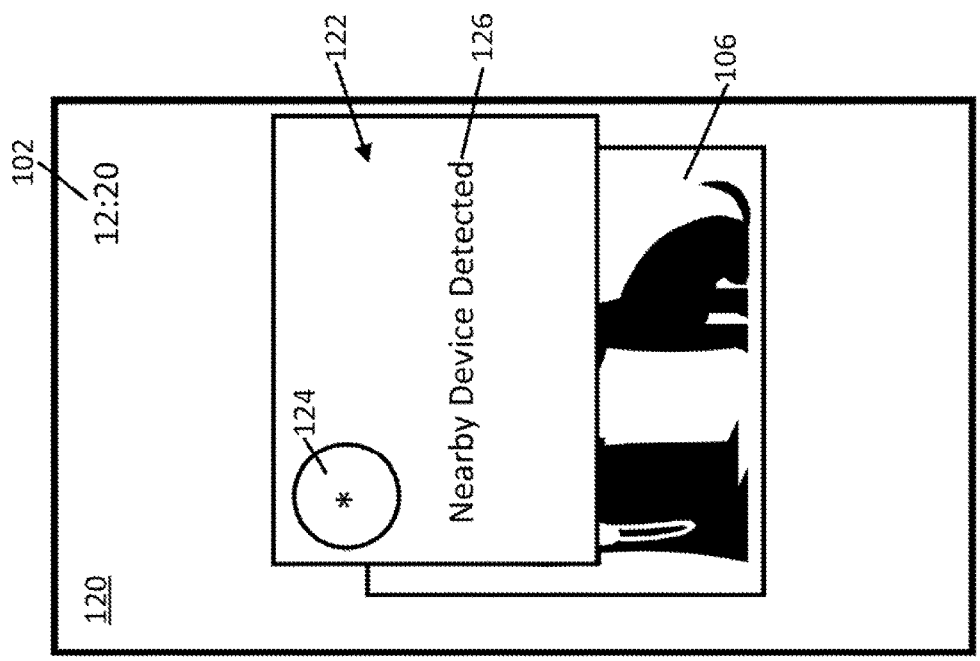
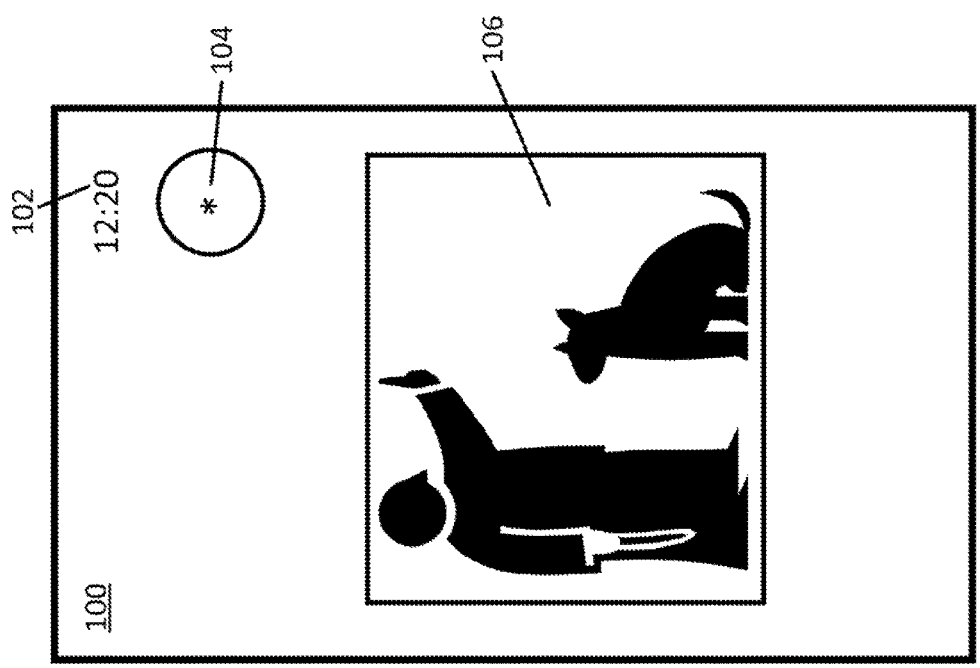
FIG. 1A
FIG. 1B

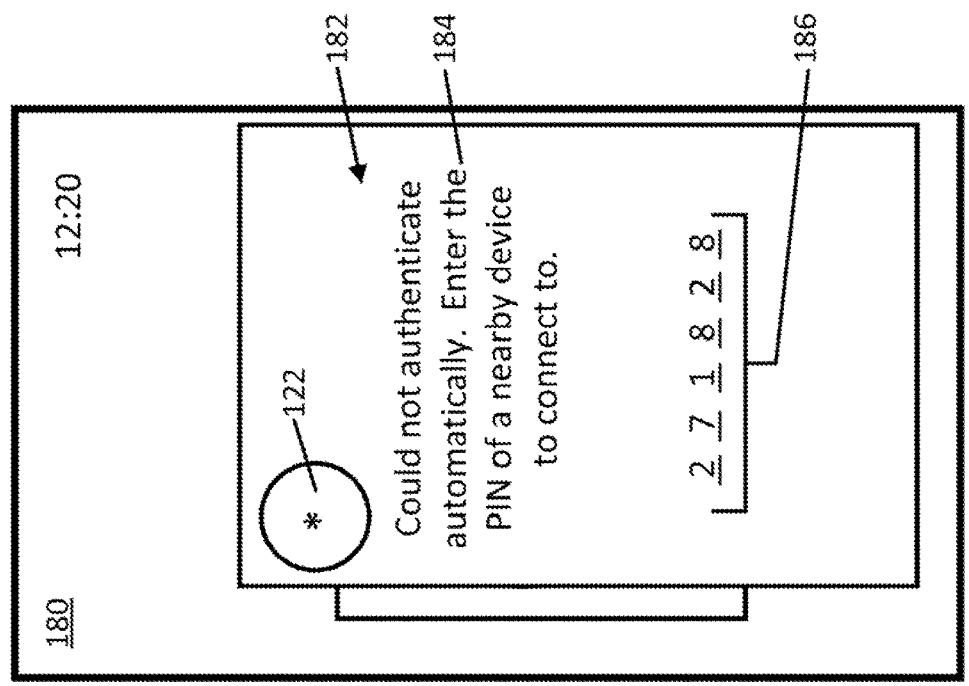

METHODS, SYSTEMS, AND MEDIA FOR AUTHENTICATING A CONNECTION BETWEEN A USER DEVICE AND A STREAMING MEDIA CONTENT DEVICE

CROSS REFERENCE TO RELATED APPLICATION

This application claims the benefit of U.S. Provisional Patent Application No. 62/016,470, filed Jun. 24, 2014, which is hereby incorporated by reference herein in its entirety.

TECHNICAL FIELD

The disclosed subject matter relates to methods, systems, and media for authenticating a connection between a user device and a streaming media content device.

BACKGROUND

Many users want to stream media content (such as music, videos, movies, television programs, etc.) from a mobile device to a larger display, such as a television. In some instances, users stream the media content from the mobile device to the larger display by connecting to a streaming media content device, which can cause the media content to be presented on the larger display. Users may want nearby streaming media content devices to be automatically identified and connected to their mobile devices. However, it can be difficult to determine which streaming media content devices are suitable for connection to a user's mobile device before automatically connecting the mobile device and the streaming media content device. For example, a streaming media content device that belongs to a neighbor may be automatically detected, but should not automatically be connected to the user's mobile device.

Accordingly, it is desirable to provide new methods, systems, and media for authenticating a connection between a user device and a streaming media content device.

SUMMARY

Methods, systems, and media for authenticating a connection between a user device and a streaming media content device are provided. In accordance with some implementations of the disclosed subject matter, methods for authenticating a connection between a user device and a streaming media content device are provided, the methods comprising: identifying, using a hardware processor, a collection of candidate streaming media content devices based on one or more beacons detected by a user device; receiving an indication that one of the candidate streaming media content devices is to be selected for connection to the user device; transmitting instructions to the candidate streaming media content devices to broadcast a signal, wherein the signal broadcast by each of the candidate streaming media content devices contains a value that indicates an identity of the streaming media content device; receiving, from the user device, an audio signal that includes a detected signal; processing the audio signal to extract the value indicating the identity of a particular streaming media content device associated with the detected signal contained in the received audio signal; identifying the particular streaming media content device based on the determined value; and transmitting an indication that the user device and the particular streaming media content device are authenticated to communicate with each other.

In accordance with some implementations of the disclosed subject matter, systems for authenticating a connection between a user device and a streaming media content device are provided, the systems comprising: at least one hardware processor that: identifies a collection of candidate streaming media content devices based on one or more beacons detected by a user device; receives an indication that one of the candidate streaming media content devices is to be selected for connection to the user device; transmits instructions to the candidate streaming media content devices to broadcast a signal, wherein the signal broadcast by each of the candidate streaming media content devices contains a value that indicates an identity of the streaming media content device; receives, from the user device, an audio signal that includes a detected signal; processes the audio signal to extract the value indicating the identity of a particular streaming media content device associated with the detected signal contained in the received audio signal; identifies the particular streaming media content device based on the determined value; and transmits an indication that the user device and the particular streaming media content device are authenticated to communicate with each other.

In accordance with some implementations of the disclosed subject matter, non-transitory computer-readable medium containing computer-executable instructions that, when executed by a processor, cause the processor to perform a method of authenticating a connection between a user device and a streaming media content device are provided, the method comprising: identifying a collection of candidate streaming media content devices based on one or more beacons detected by a user device; receiving an indication that one of the candidate streaming media content devices is to be selected for connection to the user device; transmitting instructions to the candidate streaming media content devices to broadcast a signal, wherein the signal broadcast by each of the candidate streaming media content devices contains a value that indicates an identity of the streaming media content device; receiving, from the user device, an audio signal that includes a detected signal; processing the audio signal to extract the value indicating the identity of a particular streaming media content device associated with the detected signal contained in the received audio signal; identifying the particular streaming media content device based on the determined value; and transmitting an indication that the user device and the particular streaming media content device are authenticated to communicate with each other.

In accordance with some implementations of the disclosed subject matter, systems for authenticating a connection between a user device and a streaming media content device are provided, the systems comprising: means for identifying a collection of candidate streaming media content devices based on one or more beacons detected by a user device; means for receiving an indication that one of the candidate streaming media content devices is to be selected for connection to the user device; means for transmitting instructions to the candidate streaming media content devices to broadcast a signal, wherein the signal broadcast by each of the candidate streaming media content devices contains a value that indicates an identity of the streaming media content device; means for receiving, from the user device, an audio signal that includes a detected signal; means for processing the audio signal to extract the value indicating the identity of a particular streaming media content device associated with the detected signal contained in the received audio signal; means identifying the particular streaming media content device based on the determined value; and means for transmitting an indication that the user device and the particular streaming media content device are authenticated to communicate with each other. In some embodiments, the means for identifying the collection of candidate streaming media content devices compares identification numbers included in the one or more beacons with a list that associates identification numbers with known streaming media content devices. In some embodiments, the systems further comprise means for filtering the collection of candidate streaming media content devices based on applications supported by each of the collection of candidate streaming media content devices. In some embodiments, the systems further comprise means for filtering the collection of candidate streaming media content devices based on applications that connect to particular streaming media content sites. In some embodiments, the systems further comprise means for filtering the collection of candidate streaming media content devices based on applications that support mirroring of content between the mobile device and the streaming media content device. In some embodiments, the signal broadcast by each of the candidate streaming media content devices is an audio signal. In some embodiments, the means for identifying the particular streaming media content device based on the determined value identifies one or more frequencies associated with a PIN embedded in the audio signal. In some embodiments, the systems further comprise means for determines if the value was extracted from the audio signal by the processing; and means for receiving a manual entry of the value when the value was not extracted.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 1A and 1B show examples of user interfaces for indicating that streaming media content devices have been detected in accordance with some implementations of the disclosed subject matter.

FIG. 1E shows an example of a user interface for authenticating a connection between a mobile device and a streaming media content device using a personal identification number (PIN) entered in the user interface in accordance with some implementations of the disclosed subject matter.

DETAILED DESCRIPTION

Figure 1C:
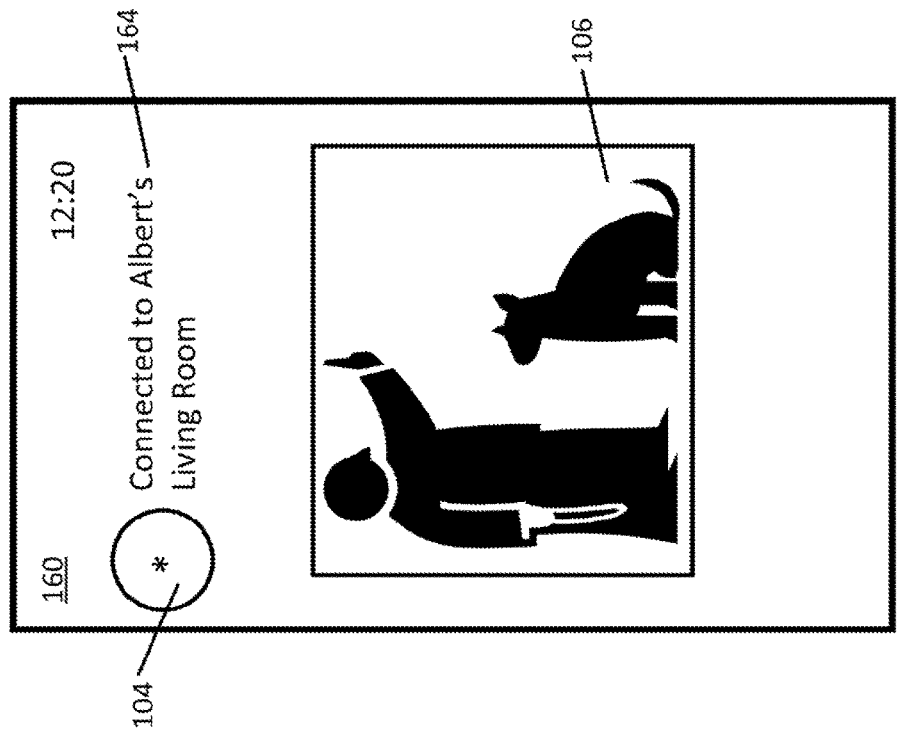
FIG. 1C shows an example of a user interface for indicating that an ultrasonic signal is being detected to authenticate a streaming media content device in accordance with some implementations of the disclosed subject matter.

In accordance with various implementations, mechanisms (which can include methods, systems, and media) for authenticating a connection between a user device and a streaming media content device are provided.

In some implementations, the mechanisms described herein can be implemented on a device detection server, a mobile device, and one or more streaming media content devices.

In some implementations, the streaming media content devices can transmit signals that include an identifying beacon, which can be detected by a nearby mobile device (e.g., a mobile phone, a tablet computer, a laptop computer, and/or any other suitable mobile device). An indication of the detected beacons can be transmitted from the mobile device to the device detection server. In some implementations, the device detection server can identify a collection of detected streaming media content devices based on the received indications of the detected beacons. Based on the identification of the streaming media content devices, the device detection server can then transmit a message to the mobile device that indicates that one or more candidate streaming media content devices have been detected. In some implementations, the mobile device can cause an icon indicating the detected streaming media content devices to be presented.

In response to determining that a user wants to connect a mobile device to one of the detected streaming media content devices (e.g., by determining that the icon has been selected on the mobile device), the device detection server can transmit instructions to the one or more candidate streaming media content devices that cause the streaming media content devices to each broadcast a signal (e.g., an ultrasonic signal, an audible audio signal, an optical signal, and/or any other suitable signal) that contains a personal identification number (PIN) specific to the corresponding streaming media content device. The mobile device can then detect the broadcasted signal. In some implementations, the mobile device can extract the PIN from the detected signal and can transmit the PIN to the device detection server to identify a particular streaming media content device that is nearby to the mobile device (e.g., within the same room and/or within a particular distance). Additionally or alternatively, in some implementations, the mobile device can transmit the detected signal to the device detection server, which can extract the PIN to identify the particular streaming media content device. In some implementations, in response to identifying the particular nearby streaming media content device, the device detection server can transmit information regarding a relay endpoint through which the mobile device and the identified streaming media content device can establish an authenticated connection.

In some implementations, a streaming media content device can be a device which can receive communications from a mobile device through a communications network (e.g., a WiFi network, a BLUETOOTH network, a 3G network, a 4G/LTE network, the Internet, and/or any other suitable communications network) and can cause media content to be presented on a corresponding media playback device in response to the received communications. In some implementations, a streaming media content device can be connected to a media playback device (e.g., a television, a projector, a stereo, a monitor, and/or any other suitable media playback device). For example, in some implementations, a streaming media content device can be connected to a media playback device through a High-Definition Multi-Media Interface (HDMI) port on the media playback device. In some implementations, a streaming media content device can cause any suitable media content to be presented (e.g., audio content, video content, images, and/or any other suitable content) using any suitable protocols (e.g., adaptive bitrate streaming, HTTP live streaming, and/or any other suitable protocols).

In some implementations, a streaming media content device can be integrated within any suitable media playback device. Additionally or alternatively, in some implementations, actions performed by a streaming media content device, such as broadcasting an ultrasonic signal, and/or any other suitable actions, can be performed instead by a media playback device, and, in some such implementations, the streaming media content device can be omitted.

Figure 1D:
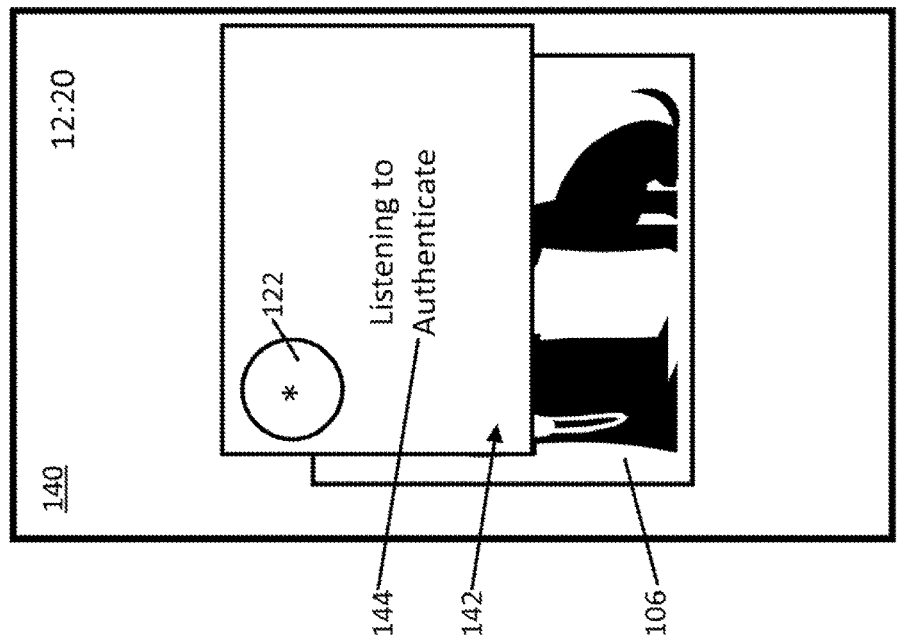
FIG. 1D shows an example of a user interface for indicating that a connection between a user device and a streaming media content device has been established in accordance with some implementations of the disclosed subject matter.

FIGS. 1A-1D show examples of user interfaces for indicating that nearby streaming media content devices have been detected (FIGS. 1A and 1B), indicating that a mobile device presenting the user interface is attempting to detect an ultrasonic audio signal to authenticate a connection between a mobile device and a streaming media content device (FIG. 1C), and indicating that a connection has been established between the mobile device and the streaming media content device (FIG. 1D). In some implementations, the user interfaces shown in FIGS. 1A-1D can be presented on any suitable mobile device, such as a mobile phone, a tablet computer, a wearable computer, a laptop computer, and/or any other suitable mobile device.

Turning to FIGS. 1A and 1B, examples 100 and 120 of user interfaces for presenting indications that streaming media content devices have been detected are shown in accordance with some implementations of the disclosed subject matter.

In some implementations, user interface 100 can include device information 102, detected devices icon 104, and media playback 106.

In some implementations, device information 102 can include any suitable information about a user device on which user interface 100 is being presented. For example, as shown in FIG. 1A, device information 102 can include an indication of a current time. In some implementations, any other suitable information, such as a date, an indication of an amount of remaining battery life, an indication of available network connections, an indication of available messages, and/or any other suitable information can be included in device information 102. In some implementations, device information 102 can include any suitable text, images, graphics, icons, animations, and/or any other suitable content.

In some implementations, detected devices icon 104 can indicate that streaming media content devices have been detected, for example, within a WiFi network in a building and/or in a user's home. Detected devices icon 104 can include any suitable images, graphics, text, icons, animations, and/or any other suitable content. For example, in some implementations, detected devices icon 104 can include an indication of a number (e.g., one, two, four, and/or any other suitable number) of detected streaming media content devices.

In some implementations, media playback 106 can include playback of any suitable media content. For example, in some implementations the media content can include video content, audio content, audiobooks, streaming media content (e.g., streaming television programs, radio programs, and/or any other suitable content). In some implementations, media playback 106 can be omitted.

In some implementations, detected devices icon 104 can be selectable. In some implementations, selection of detected devices icon 104 can cause user interface 120 to be presented. Alternatively, in some implementations, user interface 120 can be presented automatically in response to a determination that streaming media content devices have been detected. In some implementations, user interface 120 can include a message window 122, a detected device icon 124, and/or a detected device message 126.

In some implementations, message window 122 can be any message window suitable for presenting a message that streaming media content devices have been detected. For example, as shown in FIG. 1B, message window 122 can be a pop-up window that is overlaid on media playback 106. In some implementations, message window 122 can be omitted.

In some implementations, detected device icon 124 and/or detected device message 126 can be presented within message window 122. In some implementations, detected device icon 124 can be the same as detected device icon 104. In some implementations, detected device icon 124 can be omitted. Detected device message 126 can include any suitable message. For example, in some implementations, detected device message 126 can include an indication of a number of detected streaming media content devices. In some implementations, detected device icon 124 and/or detected device message 126 can be omitted.

In some implementations, message window 122 and/or detected device message 126 can dismissed through any suitable user interaction (e.g., clicking on message window 122 and/or message 126, swiping message window 122 off the screen, and/or any other suitable interaction).

In some implementations, a connection between a mobile device (e.g., the mobile device presenting the user interfaces of FIGS. 1A-1D) and a streaming media content device can be authenticated based on a PIN contained in an ultrasonic signal transmitted by the streaming media content device and received by the mobile device. FIG. 1C shows an example 140 of a user interface that can be presented by the mobile device that can indicate that the mobile device is detecting the ultrasonic signal in accordance with some implementations of the disclosed subject matter. In some implementations, user interface 140 can include a message window 142 and a listening for audio message 144.

In some implementations, message window 142 can be any suitable message window for presenting a message that the mobile device is attempting to detect audio content. For example, as shown in FIG. 1C, message window 142 can be a pop-up window that is overlaid on media playback 106. In some implementations, message window 142 can be omitted.

In some implementations, listening for audio message 144 can include any suitable text, icons, images, graphics, and/or any other suitable content for indicating that the mobile device is currently attempting to detect audio content. For example, in some implementations, listening for message 144 can include an icon (not shown) depicting a microphone, indicating that a microphone associated with the mobile device is being used for detecting the audio content. In some implementations, listening for audio message 144 can be omitted.

FIG. 1D shows an example 160 of a user interface that can be presented to indicate that a connection has been established between a mobile device and a streaming media content device in accordance with some implementations of the disclosed subject matter. As shown, user interface 160 can include a connection message 164 that can include any suitable text, images, graphics, icons, and/or any other suitable content for indicating the connection. In some implementations, connection message 164 can include any suitable identifiers of the particular streaming media content device to which the mobile device is connected, for example, a name associated with the particular streaming media content device, as shown in FIG. 1D.

In some implementations, authentication of the connection between a mobile device and a streaming media content device may not be possible through an ultrasonic signal. In some such implementations, the connection can be authenticated through manual input of a PIN associated with the streaming media content device, as shown in user interface 180 of FIG. 1E. As shown, user interface 180 can include a message window 182, an enter PIN message 184, and a PIN input 186.

Message window 182 can be any message window suitable for indicating that automatic authentication was not possible. For example, in some implementations, enter PIN message 184 can be presented within message window 182. In some implementations, message window 182 can be a pop-up message, as shown in FIG. 1E. In some implementations, any suitable text, images, icons, graphics, and/or any other suitable content can be included in message window 182 and/or enter PIN message 184.

PIN input 186 can be any suitable input mechanism for allowing a user to enter a PIN associated with a streaming media content device to which the mobile device is to be connected. In some implementations, PIN input 186 can allow any suitable characters (e.g., numbers, letters, non-alphanumeric characters, and/or any other suitable characters) to be entered. Although not shown in FIG. 1E, in some implementations, PIN input 186 can include presentation of a keyboard suitable for entering a PIN. Although six inputs are included in PIN input 186, in some implementations, any suitable number (e.g., one, two, five, ten, and/or any other suitable number) of inputs can be included.

Note that, in instances where authentication via an ultrasonic signal is not possible, a connection between a mobile device and a streaming media content device can be authenticated using any other suitable technique or combination of techniques. For example, in some implementations, a PIN can be embedded in an optical signal (e.g., through any suitable modulation techniques) that is presented on a media playback device connected to a streaming media content device. The optical signal can then be detected by the mobile device (e.g., using a camera associated with the mobile device), and the optical signal and/or the extracted PIN can be transmitted to a device detection server to authenticate the connection. As another example, in some implementations, a barcode can be presented on a media playback device connected to a streaming media content device. The barcode can be detected by the mobile device (e.g., using a camera associated with the mobile device), and the detected barcode can be transmitted to the device detection server to authenticate the connection.

Figure 2:
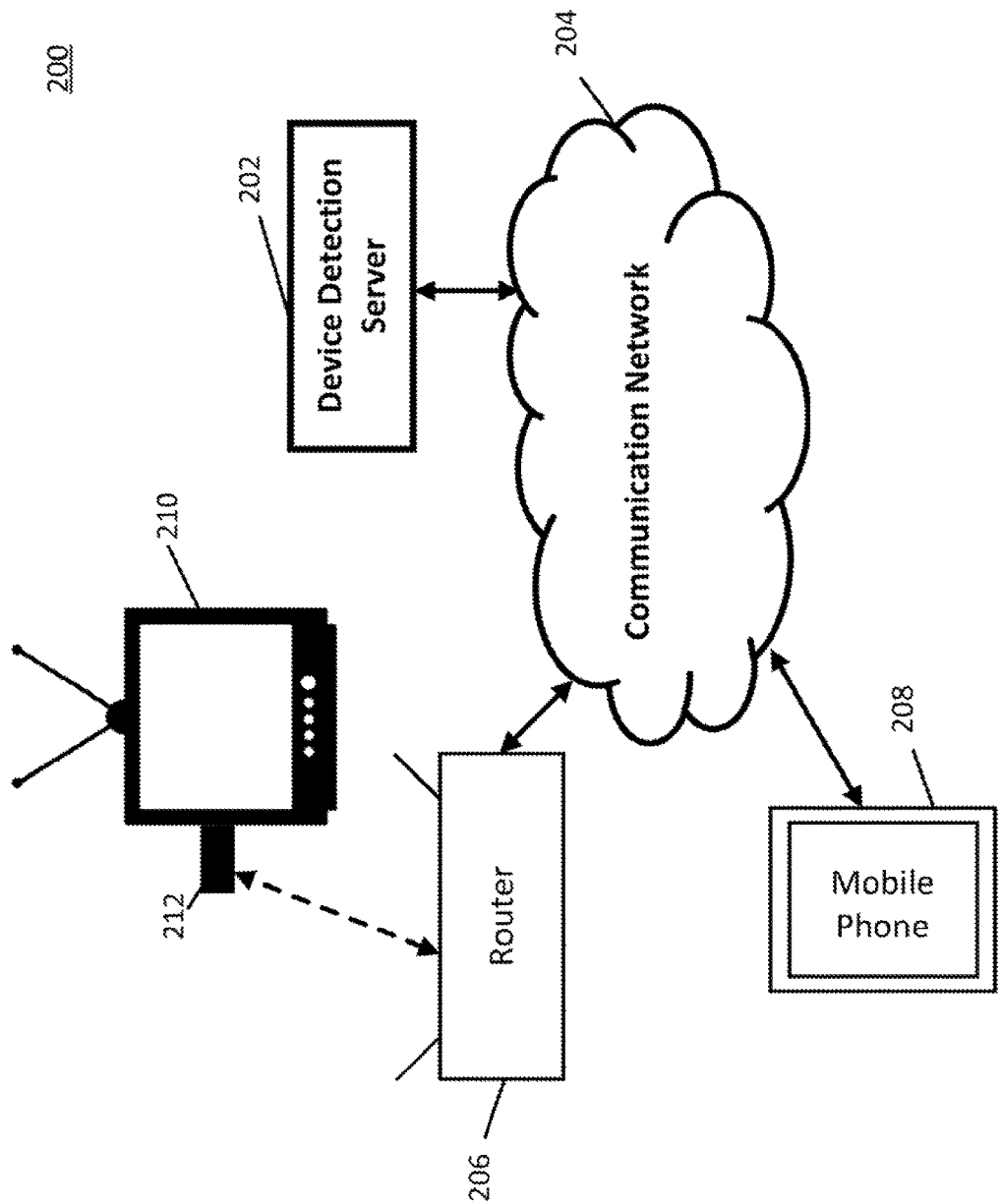
FIG. 2 shows a schematic diagram of an illustrative system suitable for implementation of mechanisms described herein for authenticating a connection using an ultrasonic signal in accordance with some implementations of the disclosed subject matter.

Turning to FIG. 2, an example 200 of hardware for authenticating a connection using an ultrasonic signal that can be used in accordance with some implementations of the disclosed subject matter is shown. As illustrated, hardware 200 can include a device detection server 202, a communication network 204, a router 206, a mobile device 208, a media playback device 210, and a streaming media content device 212.

Device detection server 202 can be any suitable server for identifying streaming media content devices and/or performing any suitable functions for allowing a mobile device and a streaming media content device to connect. For example, in some implementations, device detection server 202 can identify a collection of candidate streaming media content devices. As another example, in some implementations, device detection server 202 can transmit instructions to the collection of candidate streaming media content devices to broadcast an ultrasonic signal. As yet another example, in some implementations, device detection server 202 can authenticate a connection between a particular streaming media content device and a mobile device based on a PIN received from a mobile device and/or based on an audio signal containing a PIN received from the mobile device, as described below in connection with FIG. 4. As still another example, in some implementations, device detection server 202 can transmit information related to a relay endpoint through which a mobile device and a streaming media content device can establish a connection, as described below in connection with FIG. 4.

Although device detection server 202 is illustrated as one device, the functions performed by device detection server 202 can be performed using any suitable number of devices in some implementations. For example, in some implementations, multiple devices can be used to implement the functions performed by device detection server 202.

Communication network 204 can be any suitable combination of one or more wired and/or wireless networks in some implementations. For example, communication network 210 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. Router 206, mobile device 208, and/or streaming media content device 212 can be connected by one or more communications links to communication network 204 that can be linked via one or more communications links to device detection server 202. The communications links can be any communications links suitable for communicating data among router 206, mobile device 208, streaming media content device 212 and device detection server 202 such as network links, dial-up links, wireless links, hard-wired links, any other suitable communications links, or any suitable combination of such links.

Router 206 can be any suitable device that connects user devices to communication network 204. For example, in some implementations, router 206 can be a cable router, a digital subscriber line (DSL) router, and/or any other suitable type of router. Although only one router is shown in FIG. 2, in some implementations, any suitable number of routers can be included.

Mobile device 208 can include one or more mobile devices suitable for connecting to a streaming media content device. For example, in some implementations, mobile device 208 can be a mobile phone, a tablet computer, a wearable computer, a laptop computer, a vehicle (e.g., a car, a boat, an airplane, or any other suitable vehicle) entertainment system, and/or any other suitable mobile device, that can be used to cause a media content item to be presented on media playback device 210. Although only one mobile device is shown in FIG. 2, in some implementations, any suitable number of mobile devices can be included.

Media playback device 210 can be any suitable user device for presenting media content (e.g., video content, audio content, images, slideshows, and/or any other suitable type of content). For example, in some implementations, media playback device 210 can be a television, a stereo, a projector, a monitor, a game console, a desktop computer, and/or any other suitable device for presenting media content.

Streaming media content device 212 can be any suitable device for receiving an indication of media content to be presented from mobile device 208 and causing the indicated media content to be presented on media playback device 210. As described above, in some implementations, streaming media content device 212 can be connected to media playback device 210 through an HDMI port on media playback device 210. In some implementations, streaming media content device 212 can transmit beacons indicating an identity associated with streaming media content device 212. Additionally, in some implementations, streaming media content device 212 can broadcast a signal containing a PIN associated with streaming media content device 212 in response to receiving instructions from device detection server 202, as described below in connection with FIG. 4.

Figure 3:
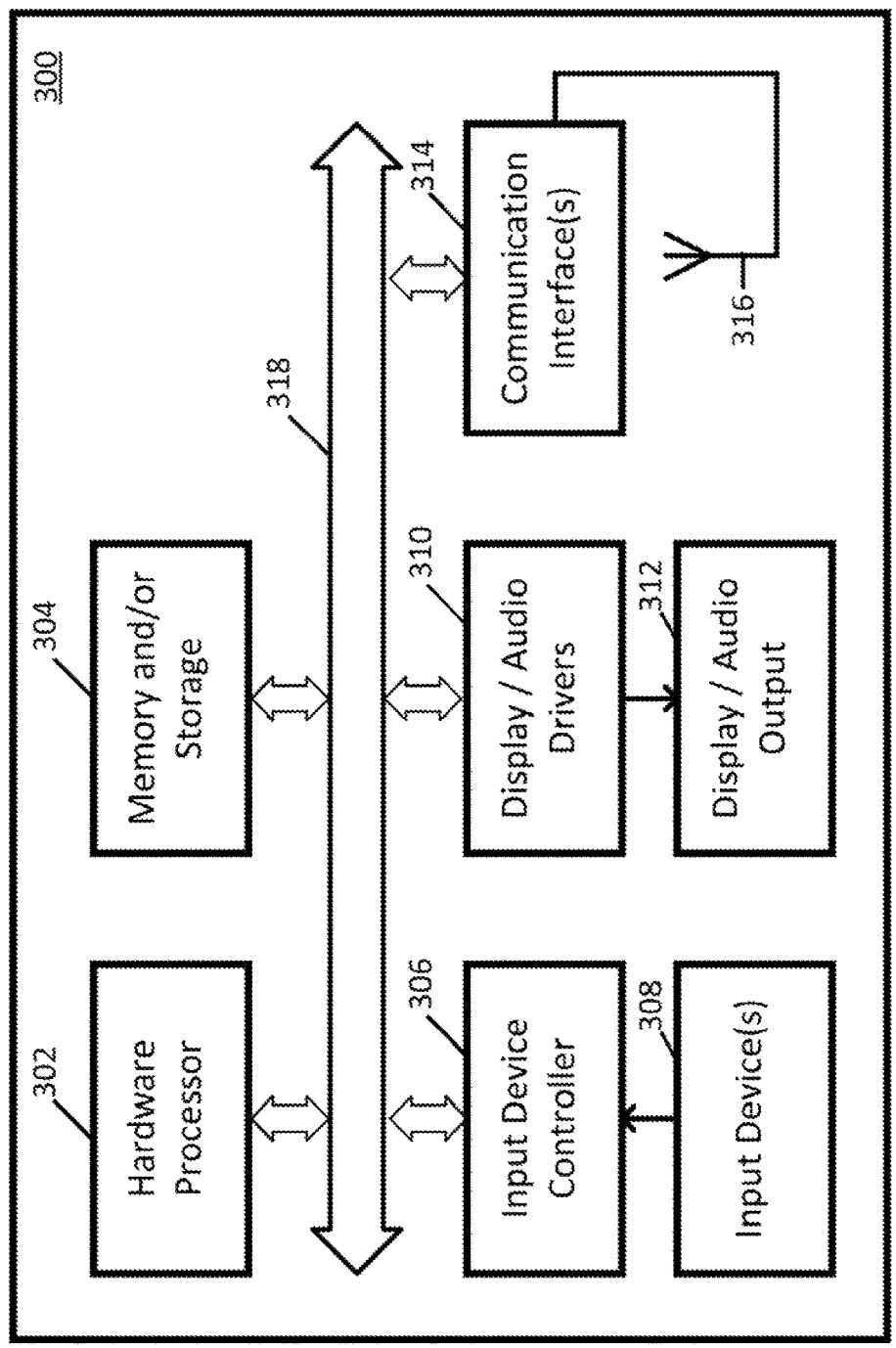
FIG. 3 shows a detailed example of hardware that can be used in a server and/or a user device of FIG. 2 in accordance with some implementations of the disclosed subject matter.

Device detection server 202, router 206, mobile device 208, media playback device 210, and streaming media content device 212 can be implemented using any suitable hardware in some implementations. For example, in some implementations, devices 202, 206, 208, and 212 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some implementations.

In some implementations, for example, when hardware 300 is used to implement device detection server 202, hardware processor 302 can be controlled by a server program stored in memory and/or storage 304 of the server. As another example, in some implementations, a server program can cause hardware processor 302 to identify a particular streaming media content device based on a PIN and/or a signal containing a PIN received from mobile device 206, as described below in connection with FIG. 4.

In some implementations, for example, when hardware 300 is used to implement mobile device 208, hardware processor 302 can be controlled by a computer program stored in memory and/or storage 304 of the mobile device. For example, the computer program can cause hardware processor 302 to present an icon indicating that streaming media content devices have been detected, detect an audio signal, and/or perform any other suitable actions.

In some implementations, for example, when hardware 300 is used to implement streaming media content device 212, hardware processor 302 can be controlled by a computer program stored in memory and/or storage 304 of the streaming media content device. For example, the computer program can cause hardware processor 302 to broadcast an ultrasonic signal that contains a PIN associated with the streaming media content device.

Memory and/or storage 304 can be any suitable memory and/or storage for storing programs, data, media content, and/or any other suitable information in some implementations. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some implementations. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device. As a more particular example, in some implementations, input device controller 306 can cause an audio signal to be recorded using a microphone, as described below in connection with FIG. 4.

Display/audio drivers 310 can be any suitable circuitry for controlling and driving output to one or more display/audio output devices 312 in some implementations. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some implementations. In some implementations, antenna 316 can be omitted.

Bus 318 can be any suitable mechanism for communicating between two or more components 302, 304, 306, 310, and 314 in some implementations.

Any other suitable components can be included in hardware 300 in accordance with some implementations.

Figure 4:
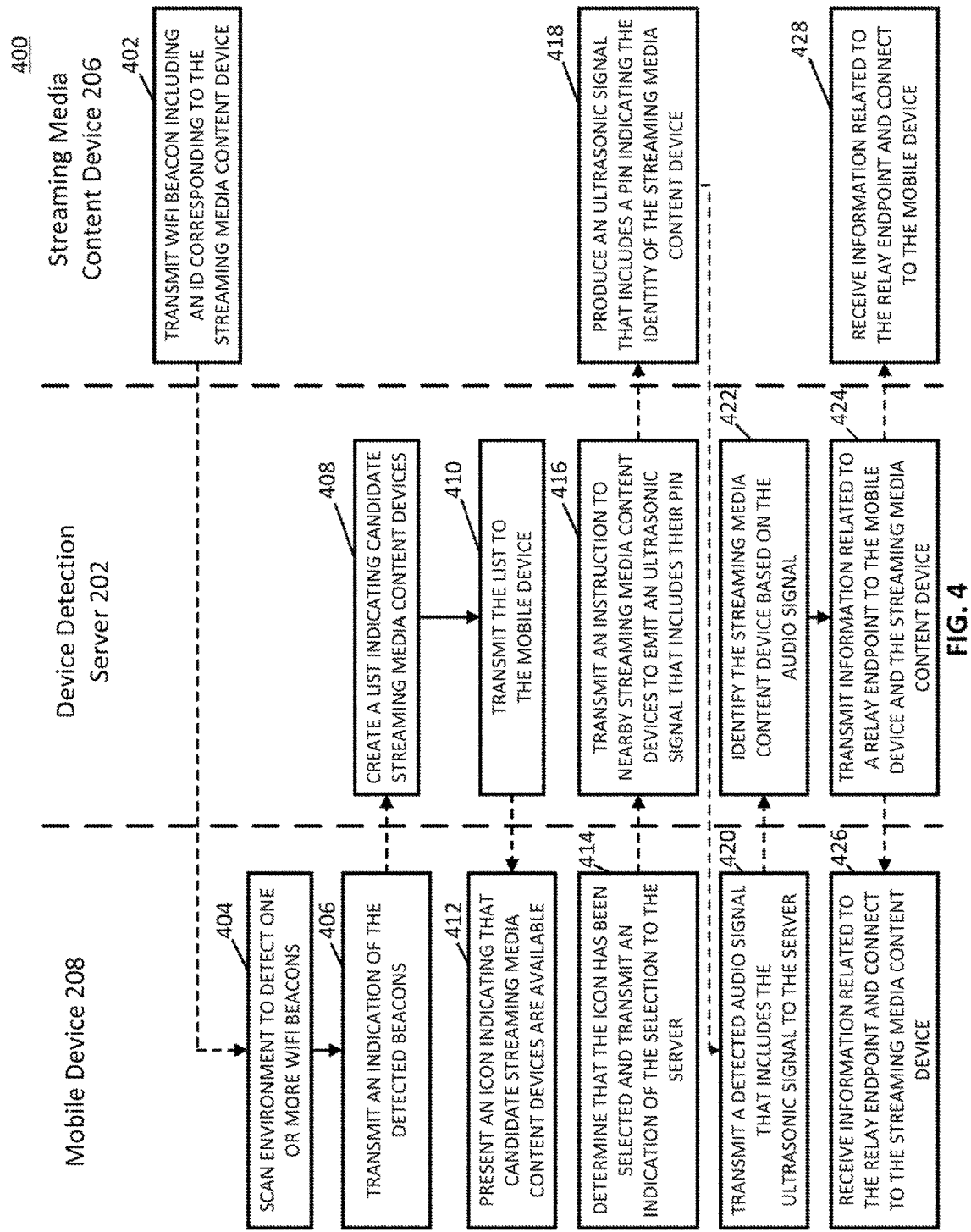
FIG. 4 shows an example of a process for identifying nearby streaming media content devices and authenticating a connection between a mobile device and a streaming media content device in accordance with some implementations of the disclosed subject matter.

Turning to FIG. 4, an example 400 of a process for identifying candidate streaming media content devices and authenticating a connection between a mobile device and a particular streaming media content device is shown in accordance with some implementations of the disclosed subject matter. Note that the blocks of process 400 are shown as being performed by mobile device 208, device detection server 202, and streaming media content device 212.

At 402, the streaming media content device can transmit a beacon that includes an identification indicating an identity of the streaming media content device. In some implementations, the identification can include any suitable information, such as a number identifying the streaming media content device, a name associated with the streaming media content device, a location of the streaming media content device, and/or any other suitable information. In some implementations, the beacon can include a basic service set identification (BSSID) and/or a service set identification (SSID) number. For example, in some implementations, the BSSID can indicate a manufacturer of the streaming media content device. In some implementations, the beacon can be associated with any suitable protocol and/or standard (e.g., IEEE 802.11, and/or any other suitable standard). The streaming media content device can transmit beacons at any suitable frequency (e.g., every minute, every ten minutes, every hour, and/or any other suitable frequency).

At 404, the mobile device can detect one or more beacons transmitted by one or more streaming media content devices using any suitable technique or combination of techniques. For example, in some implementations, the mobile device can detect the one or more beacons by listening for radio signals from the streaming media content device(s). Any suitable number (e.g., one, two, four, ten, and/or any other suitable number) of beacons corresponding to any suitable number of streaming media content devices can be detected. Additionally, note that the beacons detected by the mobile device can correspond to streaming media content devices at any suitable location and/or distance from the mobile device. For example, in some implementations, the detected beacons can correspond to streaming media content devices located in the same room as the mobile device, a different room within the user's home, a neighbor's apartment, and/or located at any other suitable location.

At 406, the mobile device can transmit indications of the detected beacons to device detection server 202 via communication network 204.

Device detection server 202 can create a list indicating candidate streaming media content devices at 408 using the indications of the detected beacons received from the mobile device. In some implementations, device detection server 202 can create the list of candidate streaming media content devices by comparing the set of detected beacons received from the mobile device with information about the streaming media content devices. For example, in some implementations, device detection server 202 can identify the candidate streaming media content devices by comparing identification numbers included in the received beacons with a list that associates identification numbers with known streaming media content devices. In some implementations, device detection server 202 can filter the identified candidate streaming media content devices based on applications supported by each of the candidate streaming media content devices. In some implementations, the applications can include applications that connect to particular streaming media content sites, applications that support mirroring of content between the mobile device and the streaming media content device, and/or any other suitable applications.

Device detection server 202 can transmit an indication that candidate streaming media content devices are available to the mobile device at 410. In some implementations, the indication can be a Boolean value indicating whether or not at least one streaming media content device is available. Alternatively, in some implementations, the indication can additionally include an indication of the number of available candidate streaming media content devices.

The mobile device can cause an icon (e.g., as shown in FIG. 1A) and/or a message (e.g., as shown in FIG. 1B) indicating that one or more streaming media content devices are available to be presented at 412. In some implementations, the icon and/or the message can be presented for a period of time (e.g., five seconds, ten seconds, one minute, five minutes, and/or any other suitable period of time) and can automatically disappear after the period of time has elapsed. Alternatively, in some implementations, the icon and/or the message can be presented until dismissed by a user (e.g., by clicking and/or swiping the icon and/or the message).

The mobile device can determine that the icon and/or the message have been selected and can then transmit an indication of the selection of the icon and/or the message to device detection server 202 at 414.

In response to receiving a message indicating that the icon and/or the message has been selected on the mobile device, device detection server 202 can transmit instructions to the candidate streaming media content devices at 416 instructing the candidate streaming media content devices to each broadcast an audio signal (e.g., an ultrasonic signal, an audible audio signal, and/or any other suitable audio signal).

The candidate streaming media content devices can each produce and/or broadcast an ultrasonic signal at 418. In some implementations, the ultrasonic signal can be of any suitable duration and can be within any suitable ultrasonic frequency range. In some implementations, each ultrasonic signal can include a PIN specific to the streaming media content device broadcasting the ultrasonic signal. The PIN can be embedded within the ultrasonic signal using any suitable technique or combination of techniques. For example, in some implementations, each character of the PIN can correspond to a particular frequency, and the particular frequencies can be combined using any suitable techniques to create the ultrasonic signal. For example, in some implementations, the particular frequencies can be used to modulate (e.g., using amplitude modulation, frequency modulation, and/or any other suitable type of modulation) an ultrasonic carrier wave. In some implementations, each character can correspond to multiple (e.g., two, three, and/or any other suitable number) frequencies, and the multiple frequencies can be superimposed in any suitable manner to represent each character. Note that although the signal broadcast by the candidate streaming media content devices has been described as within an ultrasonic frequency range, in some implementations, an audio signal within any suitable frequency range can be used. Additionally or alternatively, in some implementations, the frequency range of the broadcast signal can be set and/or modified, for example, within a settings user interface of a user device.

In some implementations, the PIN can be restricted to a particular number of characters (e.g., four, six, and/or any other suitable number). Additionally or alternatively, in some implementations, the characters of the PIN can be restricted to a particular set of characters (e.g., digits 0-9, and/or any other suitable set). In some implementations, the PIN can be set and/or modified, for example, through a user interface (not shown) on user device 206. Additionally or alternatively, in some implementations, the PIN can be randomly set and/or re-set at any suitable frequency (e.g., once per day, once per week, once per month, and/or any other suitable frequency).

The mobile device can detect an audio signal that includes the ultrasonic signal at 420 using any suitable technique or combination of techniques. For example, in some implementations, hardware processor 302 on the mobile device can cause input device controller 306 associated with a microphone of the mobile device to detect audio signals. The mobile device can then transmit the detected audio signal to device detection server 202. In some implementations, the detected audio signal can be stored in memory 304 of the mobile device (e.g., in a buffer) before it is transmitted to device detection server 202. In some implementations, the mobile device can perform any suitable signal processing prior to transmitting the detected audio signal (e.g, compression, filtering, and/or any other suitable processing), for example, to reduce the size of the transmitted audio signal.

Device detection server 202 can identify the streaming media content device associated with the ultrasonic signal contained in the received audio signal at 422 using any suitable technique or combination of techniques. For example, in some implementations, device detection server 202 can identify one or more frequencies associated with a PIN embedded in the ultrasonic signal using any suitable signal processing techniques. Note that in some implementations, the mobile device can perform any signal processing required to extract the PIN embedded in the ultrasonic signal to identify the corresponding streaming media content device and can transmit the extracted PIN to device detection server 202. In such implementations, block 422 can be omitted.

In some implementations, identification of a nearby streaming media content device through an ultrasonic signal may not be possible, for example, if a streaming media content device is not capable of producing ultrasonic signals and/or if the mobile device is not capable of detecting audio signals in the frequency range corresponding to the ultrasonic signals. In some such implementations, the PIN associated with the streaming media content device to which the mobile device is to be connected can be manually entered on the mobile device, for example, as shown in and described above in connection with FIG. 1E, and the entered PIN can be transmitted from the mobile device to device detection server 202. Additionally or alternatively, in some implementations, the PIN can be broadcast by the streaming media content device using any other suitable signal (e.g., a barcode presented on a media playback device connected to the streaming media content device, an optical signal presented on a media playback device connected to the streaming media content device, and/or any other suitable signal), and the mobile device can detect the signal and transmit the signal and/or the extracted PIN.

If the received PIN corresponds to one of the candidate streaming media content devices, device detection server 202 can transmit information regarding a relay endpoint to the mobile device and the particular streaming media content device that corresponds to the received PIN at 424.

At 426 and 428, the mobile device and the streaming media content device, respectively, can establish connections with each other using the relay endpoint indicated by device detection server 202.

After a connection has been established between the mobile device and the streaming media content device, media content can be presented on a media playback device connected to the streaming media content device using any suitable information and any suitable technique(s). For example, in some implementations, an indication (e.g., a URL) of a particular media content item can be transmitted from the mobile device to the streaming media content device, and the streaming media content device can access the indicated media content item and begin presenting the media content item on a connected media playback device. As another example, in some implementations, the mobile device can transmit the media content item to the streaming media content device, and the streaming media content device can cause the received media content item to be presented on a connected media playback device. In some implementations, any suitable protocol can be used to transfer data associated with the media content item, such as adaptive bitrate streaming, HTTP live streaming, user datagram protocol (UDP), and/or any other suitable protocol).

In some implementations, at least some of the above described blocks of the processes of FIG. 4 can be executed or performed in any order or sequence not limited to the order and sequence shown in and described in connection with this figure. Also, some of the above blocks of FIG. 4 can be executed or performed substantially simultaneously where appropriate or in parallel to reduce latency and processing times. Additionally or alternatively, some of the above described blocks of the processes of FIG. 4 can be omitted.

In some implementations, any suitable computer readable media can be used for storing instructions for performing the functions and/or processes herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for authenticating a connection between a user device and a streaming media content device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for authenticating a connection between a user device and a streaming media content device, comprising:

detecting, using a hardware processor of the user device, a collection of candidate streaming media content devices based on one or more beacons;

in response to the detection, causing an interface to be presented on the user device indicating that the collection of candidate streaming media content devices has been detected during playback of media content on the user device;

receiving an interaction with the interface indicating that one of the candidate streaming media content devices is to be selected for connection to the user device;

in response to receiving the interaction with the interface, determining which of the candidate streaming media content devices to select for connection with the user device by:

transmitting instructions to each of the candidate streaming media content devices to broadcast an audio signal, wherein the audio signal broadcast by each of the candidate streaming media content devices contains an embedded value that identifies the streaming media content device from the collection of candidate streaming media content devices;

updating the interface to indicate that the user device is listening for one or more audio signals from the candidate streaming media content devices;

receiving the audio signal from a particular streaming media content device;

processing the audio signal to extract the embedded value that identifies the particular streaming media content device; and selecting the particular streaming media content device from the collection of candidate streaming media content devices based on the extracted value;

connecting with the particular streaming media content device for playing back media content on the particular streaming media content device; and updating the interface to indicate that the connection has been established between the user device and the particular streaming media content device in which the user device and the particular streaming media content device have been authenticated to communicate with each other.

2. The method of claim 1, wherein identifying the collection of candidate streaming media content devices comprises comparing identification numbers included in the one or more beacons with a list that associates identification numbers with known streaming media content devices.

3. The method of claim 1, further comprising filtering the collection of candidate streaming media content devices based on applications supported by each of the collection of candidate streaming media content devices.

4. The method of claim 1, further comprising filtering the collection of candidate streaming media content devices based on applications that connect to particular streaming media content sites.

5. The method of claim 1, further comprising filtering the collection of candidate streaming media content devices based on applications that support mirroring of content between the mobile device and the streaming media content device.

6. The method of claim 1, wherein the audio signal is received by causing an input device controller associated with a microphone of the user device to listen for audio signals.

7. The method of claim 1, wherein identifying the particular streaming media content device based on the extracted value indicating the identity of the particular streaming media content device comprises identifying one or more frequencies associated with a PIN embedded in the audio signal.

8. The method of claim 1, further comprising:
determining if the value was extracted from the audio signal by the processing; and
if the value was not extracted, receiving a manual entry of the value.

9. The method of claim 1, further comprising:
transmitting indications of the one or more beacons to a device detection server; and
receiving, from the device detection server, a list of the collection of candidate streaming media content devices.

10. The method of claim 1, wherein the processing further comprises:
transmitting the received audio signal to a device detection server, wherein the audio signal includes an ultrasonic signal;
receiving an identification of the particular streaming media content device based on the ultrasonic signal extracted from the received audio signal, wherein the identification includes information associated with a relay endpoint; and
establishing the connection between the user device and the particular streaming media content device using the relay endpoint.

11. A system for authenticating a connection between a user device and a streaming media content device, comprising:
at least one hardware processor of the user device that:
    detects a collection of candidate streaming media content devices based on one or more beacons;
    in response to the detection, causes an interface to be presented on the user device indicating that the collection of candidate streaming media content devices has been detected during playback of media content on the user device;
    receives an interaction with the interface indicating that one of the candidate streaming media content devices is to be selected for connection to the user device;
    in response to receiving the interaction with the interface, determine which of the candidate streaming media content devices to select for connection with the user device by:
        transmitting instructions to each of the candidate streaming media content devices to broadcast an audio signal, wherein the audio signal broadcast by each of the candidate streaming media content devices contains an embedded value that identifies the streaming media content device from the collection of candidate streaming media content devices;
        updating the interface to indicate that the user device is listening for one or more audio signals from the candidate streaming media content devices;
        receiving the audio signal from a particular streaming media content device;
        processing the audio signal to extract the embedded value that identifies the particular streaming media content device; and
        selecting the particular streaming media content device from the collection of candidate streaming media content devices based on the extracted value;

connects with the particular streaming media content device for playing back media content on the particular streaming media content device; and updates the interface to indicate that the connection has been established between the user device and the particular streaming media content device in which the user device and the particular streaming media content device have been authenticated to communicate with each other.

12. The system of claim 11, wherein the identifying the collection of candidate streaming media content devices comprises comparing identification numbers included in the one or more beacons with a list that associates identification numbers with known streaming media content devices.

13. The system of claim 11, wherein the at least one hardware processor also filters the collection of candidate streaming media content devices based on applications supported by each of the collection of candidate streaming media content devices.

14. The system of claim 11, wherein the at least one hardware processor also filters the collection of candidate streaming media content devices based on applications that connect to particular streaming media content sites.

15. The system of claim 11, wherein the at least one hardware processor also filters the collection of candidate streaming media content devices based on applications that support mirroring of content between the mobile device and the streaming media content device.

16. The system of claim 11, wherein the audio signal is received by causing an input device controller associated with a microphone of the user device to listen for audio signals.

17. The system of claim 11, wherein identifying the particular streaming media content device based on the extracted value indicating the identity of the particular streaming media content device comprises identifying one or more frequencies associated with a PIN embedded in the audio signal.

18. The system of claim 11, wherein the at least one hardware processor also:
determines if the value was extracted from the audio signal by the processing; and
if the value was not extracted, receives a manual entry of the value.

19. A non-transitory computer-readable storage medium containing computer-executable instructions that, when executed by a processor, cause the processor to perform a method of authenticating a connection between a user device and a streaming media content device, the method comprising:

detecting a collection of candidate streaming media content devices based on one or more beacons;

in response to the detection, causing an interface to be presented on the user device indicating that the collection of candidate streaming media content devices has been detected during playback of media content on the user device;

receiving an interaction with the interface indicating that one of the candidate streaming media content devices is to be selected for connection to the user device;

in response to receiving the interaction with the interface, determining which of the candidate streaming media content devices to select for connection with the user device by:
transmitting instructions to each of the candidate streaming media content devices to broadcast an audio signal, wherein the audio signal broadcast by each of the candidate streaming media content devices contains an embedded value that identifies the streaming media content device from the collection of candidate streaming media content devices;
updating the selectable interface to indicate that the user device is listening for one or more audio signals from the candidate streaming media content devices;
receiving the audio signal from a particular streaming media content device;
processing the audio signal to extract the embedded value that identifies the particular streaming media content device; and
selecting the particular streaming media content device from the collection of candidate streaming media content devices based on the extracted value;

connecting with the particular streaming media content device for playing back media content on the particular streaming media content device; and updating the interface to indicate that the connection has been established between the user device and the particular streaming media content device in which the user device and the particular streaming media content device have been authenticated to communicate with each other.

* * * * *